United States Patent [19]
Bar et al.

[11] Patent Number: 5,777,807
[45] Date of Patent: Jul. 7, 1998

[54] DEFORMABLE MIRROR, IN PARTICULAR FOR A LASER BEAM MATERIAL MACHINING APPARATUS

[75] Inventors: Klaus Bar, Lauf; Reinhard Schmiedl, Weissenburg; Brigitte Freisleben, Nurnberg, all of Germany

[73] Assignee: Diehl GmbH & Co., Nurnberg, Germany

[21] Appl. No.: 491,025

[22] Filed: Jun. 16, 1995

[30] Foreign Application Priority Data

Jun. 17, 1994 [DE] Germany ............... 94 09 869 U

[51] Int. Cl.$^6$ .................. G02B 7/182; G02B 7/185; G02B 7/195; G02B 7/198
[52] U.S. Cl. ................ 359/845; 359/846; 359/848; 359/224
[58] Field of Search .................. 359/224, 845, 359/846, 848, 849, 847

[56] References Cited

U.S. PATENT DOCUMENTS

| | | | |
|---|---|---|---|
| 4,679,915 | 7/1987 | Kriz et al. | 359/845 |
| 4,831,291 | 5/1989 | Ames | 359/849 |
| 4,861,149 | 8/1989 | Ealey | 359/849 |
| 5,020,895 | 6/1991 | Giesen et al. | 359/845 |
| 5,037,190 | 8/1991 | Ealey et al. | 359/845 |
| 5,204,784 | 4/1993 | Spinhirne | 359/849 |
| 5,210,653 | 5/1993 | Schell | 359/849 |
| 5,357,825 | 10/1994 | Costello et al. | 359/849 |
| 5,617,261 | 4/1997 | Bar et al. | 359/845 |

FOREIGN PATENT DOCUMENTS

| | | |
|---|---|---|
| 3710334 | 10/1988 | Germany. |
| 4138557 | 5/1993 | Germany. |
| 9205810 | 10/1993 | Germany. |
| 4217705 | 12/1993 | Germany. |

*Primary Examiner*—Ricky D. Shafer
*Attorney, Agent, or Firm*—Scully, Scott, Murphy & Presser

[57] ABSTRACT

A deformable mirror for a laser beam material machining apparatus including a housing for supporting a mirror plate, an electro-mechanical actuator disposed within a jacket tube, a pressure portion disposed at one end of the actuator and a rear end adaptor with a prestressing screw at the other end of the actuator for operatively acting on the mirror plate. The materials of the jacket tube and the housing as well as the materials of the pressure portion and the rear end adaptor are so selected on the basis of their linear coefficients of thermal expansion, such that a temperature change will cause essentially similar overall linear expansion.

17 Claims, 1 Drawing Sheet

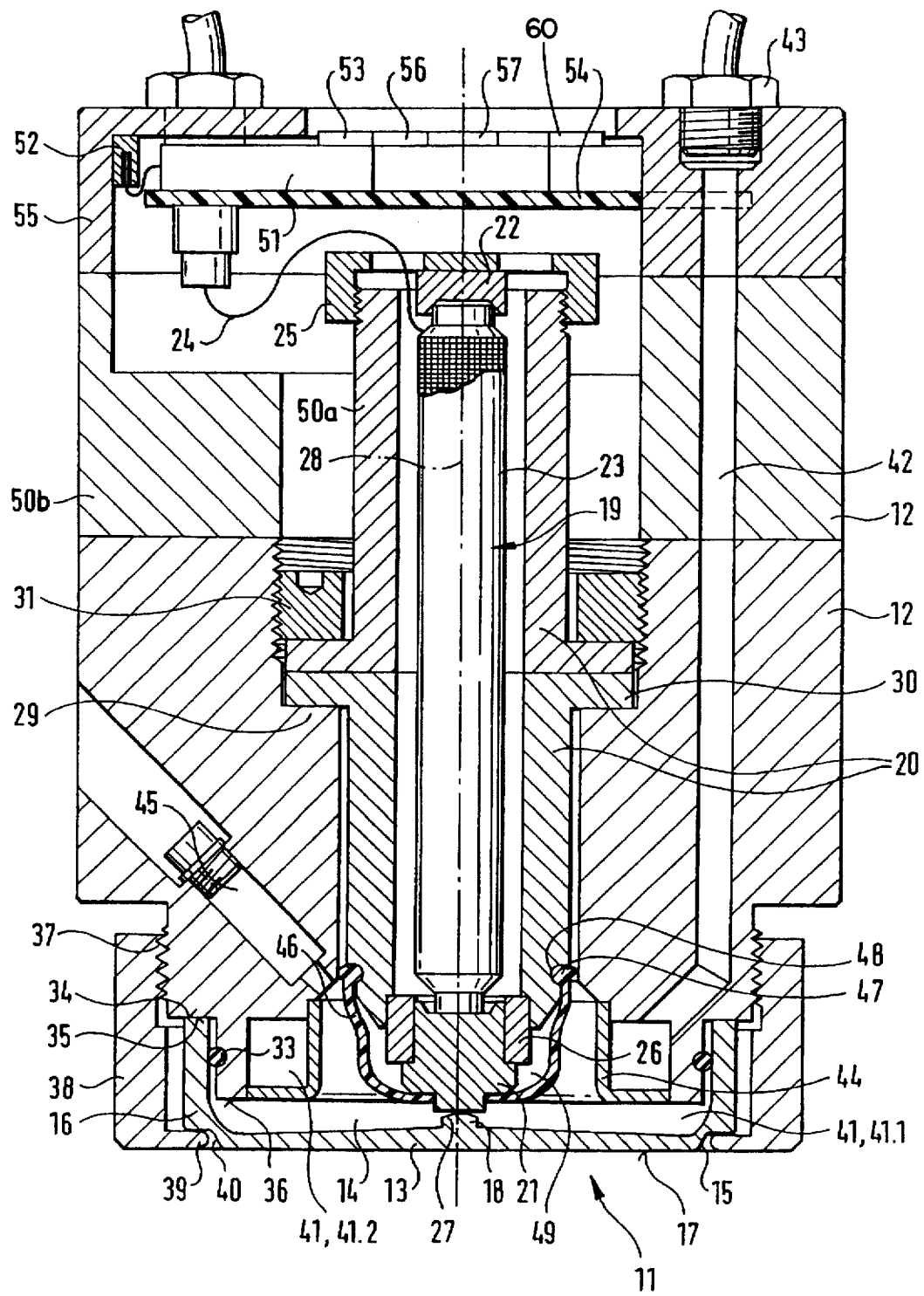

1

DEFORMABLE MIRROR, IN PARTICULAR FOR A LASER BEAM MATERIAL MACHINING APPARATUS

BACKGROUND OF THE INVENTION

Discussion of the Prior Art

The invention concerns a deformable mirror as is known from German patent specification No. 41 38 557 as a so-called process-optimizing optical means for laser machining centers, in order to provide for a varying convexity in respect of the curvable mirror surface disposed closely in front of the optical focussing means or closely behind the laser beam source, in order to optimize the focussing action or to vary the point of focus in the workpiece to be machined, as is described in greater detail for example in German utility model No. 92 05 810 or in German laid-open application (DE-OS) No. 42 17 705, for certain situations of use.

The mirror which is shown in the prior publication disclosing the general kind of apparatus involved here is particularly production-friendly and service-friendly, in consideration of its modular structure and its simple assembly procedure.

While the mirror in accordance with said prior publication relating to the general kind of apparatus involved here has proved itself in that respect, it nonetheless still suffers from the disadvantage in terms of use thereof that, after installation in the beam guide structure and after connection thereof to the external control circuit, it has to be calibrated by way of same, which involves in particular mirror curvature which is dependent on ambient temperature and the mechanically admissible stroke movement upon full electrical modulation.

SUMMARY OF THE INVENTION

In recognition of those circumstances the present invention is based on the technical problem of so developing a deformable mirror of the general kind set forth that its practical use is also simplified, which in particular concerns the static (temperature-dependent) mirror surface geometry and possibly also the dynamic stroke movement thereof upon exchange of the mirror.

In accordance with the invention that problem is essentially solved in that the mirror of the general kind set forth is also provided with an electromechanical actuator which is enclosed in a jacket tube and wherein, on the one hand, the materials of the jacket tube and that of a housing for the mirror; and on the other hand, the materials of a pressure portion and of a rear-end adaptor, in conjunction with the adaptor, are selected on the basis of their linear coefficients of thermal expansion, such that a temperature change will cause essentially similar overall linear expansions of both combinations of the above-mentioned elements.

In accordance with that solution, mechanical compensation of the influences of temperature on the static mirror surface geometry is effected by suitably matched pairings of materials for the mirror housing on the one hand and on the other hand the translator, which is guided therein, for the electrically controlled mirror curvature action. In addition it is possible to vary the prestressing effect for the flat basic setting of the mirror surface, controlled by way of a housing temperature sensor, for adaptation to the ambient temperature; and the space behind the mirror plate is desirably not acted upon directly by a flowing coolant for the dissipation of heat, but by way of a statically filled intermediate space of a volume which is variable in dependence on temperature.

By virtue of the incorporation of adjusting and compensation circuits into the housing of the mirror itself, the mirror can already be completely adjusted at the production end, so that it represents a process-optimising optical system which can be used autarkically, insofar as after a mirror change, adjustment of the external control circuit at the location of use can be eliminated.

BRIEF DESCRIPTION OF THE DRAWING

Additional alternatives and developments as well as further features and advantages of the invention will be apparent from the further claims and, having regard also to the information in the Abstract which concludes the description, from the following description of a preferred embodiment of the construction according to the invention, which is shown in the drawing in highly diagrammatic form and not entirely to scale, being restricted to what is essential.

The single FIGURE of the drawing is a view in axial longitudinal section, shown axially somewhat upset, of a deformable laser mirror of modular structure.

DETAILED DESCRIPTION OF A PREFERRED EMBODIMENT

The deformable high-energy laser mirror 11 which is diagrammatically shown in radially oversized form and on a greatly enlarged scale has at its end in front of its thick-wall and substantially tubular housing 12 a mirror plate 13 which can be curved to a greater or lesser degree out of a curved or flat rest position. The mirror plate 13 is in the form of the bottom of a shallow cup or dish 14 and therefore merges along its edge 15 into an axially short, hollow-cylindrical wall 16. The cup or dish 14 is deep-drawn from fine-structure brass of the type described in greater detail in German patent specification No. 37 10 334 because that brass, in comparison with laser mirrors made of copper, has a higher level of alternating load-carrying capability without permanent deformation in the part around the area at which pressure is applied. The outside bottom surface of the cup or dish 14, being the surface which serves as the mirror surface 17, is mechanically machined and chemically coated. Opposite thereto, that is to say at the inside surface of the bottom, and possibly disposed on a short projection 18 (shown in exaggerated form for the sake of clarity of the drawing), is a spherical end surface (also shown in exaggerated form) in the form of a cap 27 (which is formed on the inside surface of the bottom or produced by machining of the inside surface of the bottom). Here a translator 19 bears coaxially thereagainst at its end, in order by way of alternately applying pressure to the projection 18, to produce a correspondingly alternating convex and concave curvature of the mirror surface 17 out of a prestressed rest position.

In the mouth opening of a jacket tube 20 which is towards the mirror, the translator 19 has a pressure portion 21 which is axially clamped between the mirror projection cap 27 and an electromechanical actuator 23. The latter is in turn supported relative to the housing 12 by way of a rear-end adaptor 22 and a prestressing screw 25, as can be seen from the upper half of the drawing. Electrical actuation of the piezo-actuator 23 results in corresponding axial displacement of the pressure portion 21 in the opening, that is towards the mirror, of the jacket tube 20 which is fixed to the housing 12, the pressure portion 21 being axially guided and radially supported in said mirror-end opening by means of a sliding bearing or plain bearing 26. The spherical contour of the projection cap 27 provides, in relation to the flat end of the pressure portion 21 which here bears against it in planar relationship, that, even if the longitudinal displacement of the pressure portion 21 is not exactly coaxial, nonetheless pressure is always applied coaxially to the mirror surface 17 and the centre thereof is accordingly always precisely curved outwardly in the direction of the longitudinal axis 28 of the mirror, without experiencing any flexural loading by way of the projection 18.

The translator 19 is fixed in the housing 12 in such a way as to be easily dismantable by means of a housing saddle 29 which extends around same in the interior of the passage in the housing and against which a collar 30 which extends therearound in projecting flange-like relationship is biased axially towards the mirror plate 13 by means of a hollow screw 31, as can be seen in greater detail from the middle part of the drawing.

The peripherally extending wall 16 of the mirror plate 13 which is in the form of a shallow cup or dish engages over the adjacent end 36 of the housing 12, which end 36 is stepped in a radially reducing configuration, with the radial interposition of an O-ring 33 to provide for deformation-free radial centering of the cup or dish 14 in relation to the longitudinal axis 28 of the housing and the translator. The free end edge 34 of the wall 16 of the cup or dish 14, which end edge 34 is remote from the mirror plate 13, bears axially against a radially peripherally extending projection 35 of the housing. In this respect the axial height of the cup or dish 14 is of such a size that an internal space always remains guaranteed between the end 36 of the housing and the mirror plate 13, in order to avoid deformation of the mirror plate 13, caused by installation considerations. For the same reason, a cap nut 38 which is screwed with an external screwthread 37 behind the end 36 of the housing engages with its radially inwardly oriented shoulder 39 over a stepped region beside the edge 15 of the mirror plate, in front of the dish wall 16, in order to press it axially against the housing projection 35. In that way the mirror plate 13 itself is mounted in a stress-free and deformation-free manner and in a defined fashion with respect to the housing 12, along a recess 40 extending around the edge 15.

The heat due to energy losses which occurs when the mirror surface 17 is acted upon by a (high-energy) laser beam because of the reflection properties which in practice are not ideal, in the mirror plate 13, is dissipated by means of a flow of fluid through at least one cooling space 41 which is provided directly behind the mirror plate 13—between same and the respective end boundary of the housing 12 and the translator 19. The feed and discharge of coolant are effected by way of ducts 42 which extend through the housing 12 substantially parallel to the longitudinal axis 28 of the system and which each open into the cooling space 41 and which terminate opposite the mirror plate 13 in hose connections 43. In order to ensure that fluctuations in coolant pressure, which occur in practice, by virtue of acting on the side of the mirror plate 13 which is towards the cooling space 41, do not result in correspondingly fluctuating deformation of the mirror surface 17, which would be uncontrollably superimposed on the useful curvature effect to be produced solely by the translator 19, the cooling space 41 is subdivided by an angular partitioning wall 44 which is rigid but a good conductor of heat, into a static cooling space 41.1 immediately behind the mirror plate 13, and a dynamic cooling space 41.2 which is spaced therefrom. The ducts 42 for the feed and discharge of the coolant which flows through the assembly for carrying heat away open into the dynamic cooling space 41.2. The here so-called static cooling space 41.1 on the other hand is filled by way of hermetically closable filling connections 45, in as bubble-free a manner as possible, with a constant volume of fluid which is a good conductor, for the transmission of heat from the mirror plate 13 to the partition wall 44. Thus the transmission of heat due to energy losses, fran the mirror plate 13, is effected by way of the cooling space 41.1 disposed directly therebehind with static coolant and the partitioning wall 44 into the cooling space 41.2 which is away from the mirror plate 13, with its dynamic feed of coolant, for the dissipation of heat through at least one outlet duct 42 out of the mirror housing 12.

Sealing of the cooling space 41.1 which is acted upon by static coolant is effected between the mirror cup or dish 14 and the housing 12 by the centering ring 33 at the inside peripheral surface of the wall 16 of the cup or dish 14, and between the translator 19 and the housing 12 by a bellows-like, radially and axially elastic, hollow-cylindrical cuff 46 of rubber or plastic material. The cuff 46 is hermetically connected at the mirror end to the pressure portion 21, preferably by being vulcanized thereto. Its oppositely disposed edge engages sealingly with a peripherally extending knob 47 projecting in a lip-like configuration at its inside wall and its outside wall into an annular groove 48 which extends peripherally on the jacket tube 20 which is screwed against the housing 12, while a sealing effect is also provided at the outside wall relative to the housing 12 if the reducing end of the jacket tube 20, in the course of assembly of the mirror 11, upon being axially pushed on to the sliding bearing 26 of the pressure portion 21, at the same time engages into the cuff 46 which opens here. An air-filled compensating space 49 remains free between the cuff 46 and the end region, which engages into same, of the jacket tube 20, and between the cuff 46 and the outside peripheral surface of the pressure portion 21 which is disposed therein at the mirror end; the cuff 46 can elastically curve into the air-filled space 49 if the static coolant volume in the cooling space 41.1 expands due to a rise in temperature. As the elasticity of the cuff 46 is much greater than that of the mirror plate 13, that avoids any coolant pressure effect behind the mirror plate 13, which is critical in terms of deformation and which is caused by the rise in temperature; and the statically filled coolant space 41.1 remains bubble-free filled with the coolant fluid if it cools down again and its volume therefore decreases and accordingly the cuff 46 curves back out of the compensating space 49 again.

Particularly when the actuator 23 is a piezo-stack, the coefficient of thermal expansion of the actuator 23 is very much less than that of the metal housing 12 and also that of the metal jacket tube 20. Upon a rise in temperature of the mirror 11, caused by operation or due to environmental factors therefore the jacket tube 20 and the casing 12 expand in the direction of the longitudinal axis 28 to a greater degree than the actuator 23, and that results in a reduction in the pressure prestressing force applied to the mirror projection 18 and thus concave inward curvature of the statically for example flat mirror surface 17. That is undesired because the defined electrical actuation does not then provide the predetermined outward curvature of the mirror.

In order to minimize that effect, the pressure portion 21 and/or the rear-end adaptor 22 is made from a material which has a very much greater coefficient of thermal expansion than the actuator 23, and preferably one which is above that of the material for the housing 12 and for the jacket tube 20 respectively. That provides that temperature-dependent expansion of the housing 12 results in an approximately equal resulting expansion of the translator 19, and that therefore the temperature-dependent effects on the geometry of the mirror surface 17 are very substantially compensated.

In order to have degrees of freedom, in regard to the length dimensioning of the pressure portion 21 and/or the rear end adaptor 22, in dependence on the specifically used length of the actuator 23, the housing 12 and accordingly also the jacket tube 20 are constructed with respectively inner and outer ring elements 50a and 50b which are exchangeable in regard to length and possibly also in regard to the coefficient of thermal expansion. The height of the ring elements is so selected, being matched to each other, that for a given actuator 23 it is possible to achieve an adequate length for example of the rear-end adaptor 22, to provide the described compensation effect in respect of longitudinal expansion.

In addition, a temperature compensation circuit 51 with a temperature sensor 52 can be fitted into the housing 12 or its cap 55 in order to provide for electrical compensation of any temperature-dependent deformation of the mirror surface 17. For that purpose it is assumed that, at a nominal temperature of the housing 12, the mirror surface 17 is coarsely set mechanically by way of the prestressing screw 25 to a condition of planarity (which can be detected by optical measuring means such as for example an interferometer), with electrical fine adjustment by way of a planarity adjusting member 53 (for example a potentiometer) which is accessible opposite the mirror plate 13 behind the housing 12. The voltage offset which is adjusted thereby for electrical actuation of the (piezo)-actuator 23 is varied by way of the temperature compensation circuit 51 (more specifically increased with a colder housing 12) in order further to improve the independence of the current outward-curvature geometry of the mirror surface 17 from the instantaneous mirror temperature.

If a mirror 11 in an installation has to be replaced, then the electronic control system must be freshly adapted to the mirror characteristics which now occur and which, with the small stroke movements involved, are decisively determined by the manufacturing and assembly tolerances. In order not to have to perform any intervention operations in the external electronic actuating system for that purpose, the electronic system which is fitted into a cap 55 desirably also has on its printed circuit board 54 a pre-amplifier 60 with which the electromechanical mirror characteristics can be adjusted, without having to intervene in the external electronic actuating system for the new mirror 11.

The corresponding circuitry components for that adjustment are therefore disposed on at least one circuit board 54 in the housing cap 55 so that in that respect the mirror 11 which is fitted and adjusted therewith can then operate directly autarkically in the functional environment without further adjusting requirements by way of the external control circuit. The circuit board 54 can additionally be provided with a further adjusting member 56 by way of which the stroke movement involved in the outward curvature of the mirror surface, which at a maximum is to be produced by the external electrical actuation of the actuator 23, by means of electrical connection line 24 is restricted, to avoid irreversible deformation phenomena, which curvature can be measured for example by way of a mechanical precision sensor for calibration purposes in front of the center of the mirror surface 17. Further adjusting members 57 can be provided for example to initiate a warning signal generator when the working temperature rises above or falls below critical working temperature limits at the mirror 11, if therefore for example the arrangement departs from the compensation range of the initially electrically adjusted mirror 11 and therefore electrical actuation of the actuator 23 no longer results in predetermined or reproducible deformation of the mirror surface.

The drawing takes account of the fact, also in axially greatly exaggerated form for the sake of enhanced clarity thereof, that between the cap projection 18 of the mirror plate 13 and the wall 16 which extends around the periphery thereof in a hollow-cylindrical configuration, the mirror plate 13 is desirably not of a plane-parallel configuration but involves a plate thickness which is non-constant over the radius, as shown for example with a thickness which decreases from the center towards the edge. Such a shallow-frustoconical shape for the inside of the mirror plate, which can also be of a stepped configuration instead of being a progressive reduction as shown, affords the great practical advantage of being able structurally to predetermine the turning point or reversal point of the bending line of the outwardly or inwardly curved mirror surface 17 in such a way as to afford optimum influencing of the beam expansion geometry after beam reflection on the variable mirror surface.

This therefore provides a deformable laser mirror 11 which is of a modular structure and which is optimized in terms of beam geometry and which is temperature-compensated mechanically and electrically and which is also adjusted ready for operation in other respects and which can be used directly in a laser machining centre without having to be adjusted separatedly once again before being brought into operation.

We claim:

1. A deformable mirror, for a laser beam material machining apparatus, including at least one translator; a housing for supporting said mirror, said at least one translator having a pressure member for causing said at least one translator to be clamped between a rear side of a mirror plate and said housing; an electromechanical actuator enclosed in a jacket tube for operatively acting upon said pressure member, the combination of the jacket tube and the housing and the combination of elements comprising the pressure member, and a rear-end adaptor of said at least one translator in conjunction with the actuator each, respectively, being constituted of materials possessing linear coefficients of thermal expansion such that changes in temperature cause both of said combinations of elements to linearly expand to the same extent.

2. A mirror according to claim 1, wherein said housing and the jacket tube each have a coefficient of thermal expansion which is high in comparison with that of the actuator, and the pressure member and the rear-end adaptor have higher coefficients of thermal expansion than the housing and jacket tube.

3. A mirror according to claim 1, wherein the coefficients of thermal expansion of the pressure member and of said rear-end adaptor are selected with regard to the thermal expansion characteristics of said actuator such that the linear expansion of the translator over an operative temperature range is overall approximately the same as that of the mirror housing.

4. A mirror according to claim 1, wherein the housing and the jacket tube are assembled from rings which are correlated with said actuator with regard to axial length and coeffecient of thermal expansion.

5. A mirror according to claim 1, wherein a prestressing screw is provided in a region of support between the actuator and the jacket tube of said translator.

6. A mirror according to claim 1, wherein a compensation circuit displaces an actuation offset of the actuator in dependence upon temperature; and a sensor for sensing the housing temperature being provided for actuating said compensation circuit.

7. A mirror according to claim 1, wherein a compensation circuit influences a voltage offset in the activation of the actuator in dependence upon temperature.

8. A mirror according to claim 1, wherein a preamplifier is provided for adjustable correlation of the actuation of the mirror plate surfaces.

9. A mirror according to claim 1, comprising circuits and control members for selectively effecting a limitation of actuation and triggering of warning signals in dependence upon specified selective operating conditions and ambient-parameters.

10. A mirror according to claim 1, wherein a closable cooling space for a static coolant volume is arranged behind the mirror plate.

11. A mirror according to claim 10, wherein the cooling space is of a variable volume which expands in dependence upon temperature.

12. A mirror according to claim 11, wherein a resiliently-elastic cuff forms an end seal between the jacket tube and the pressure member.

13. A mirror according to claim 12, wherein the cuff is fixedly connected to the pressure member at a region thereof which faces towards the mirror plate and at an oppositely located region sealingly engages in positively-locking and force-fitting relationship with a flange-like knob extending thereabout into a peripherally extending annular groove formed in the jacket tube and sealingly contacts against said housing.

14. A mirror according to claim 1, wherein a cooling space which is disposed behind said mirror plate is divided into a first cooling space which is disposed directly behind the mirror plate for the receipt of a static coolant filling, and into a further cooling space which is separated from said first cooling space by a heat-conducting inherently stable partitioning wall, the further cooling space being provided for a coolant flow therethrough for the dissipation of heat through a duct leading out of the mirror housing.

15. A mirror according to claim 1, wherein said mirror plate comprises the bottom of an axially shallow dish having a wall radially engaging over the end region of the housing, and which is centered relative to the housing through the interposition of an elastic ring; and a cap nut providing for axial bracing of the wall against the housing.

16. A mirror according to claim 1, wherein on an inside surface which is opposite to the mirror surface of the mirror plate, said mirror plate includes a projection with a convex cap; a flat end of the translator pressure member being axially supported against said projection.

17. A mirror according to claim 1, wherein said mirror plate is of a radially non-constant thickness and possess a thickness dimension which slightly decreases linearly or in a stepped configuration from a central cap projection to the edge thereof.

* * * * *